United States Patent [19]

Hayman et al.

[11] 4,388,689

[45] Jun. 14, 1983

[54] RESTAURANT VIDEO DISPLAY SYSTEM

[75] Inventors: Richard W. Hayman; Burton Goldstein, both of Potomac; Joe J. Lynn, Gaithersburg; Robert J. Brown, Columbia; Robert S. Bugash, Wheaton, all of Md.

[73] Assignee: OCR Marketing Associates, Inc., Washington, D.C.

[21] Appl. No.: 229,034

[22] Filed: Jan. 28, 1981

[51] Int. Cl.³ .............................................. G06F 15/20
[52] U.S. Cl. .................................... 364/401; 364/404
[58] Field of Search ................ 364/401, 403, 404–408, 364/521, 138, 171, 188, 189, 200, 900; 340/709, 717

[56] References Cited

U.S. PATENT DOCUMENTS

| | | | |
|---|---|---|---|
| 3,588,838 | 6/1971 | Felcheck | 364/900 |
| 3,753,233 | 8/1973 | Cardell, Jr. et al. | 364/900 |
| 3,760,375 | 9/1973 | Irwin et al. | 364/200 |
| 4,192,006 | 3/1980 | Hausdorff | 364/408 |
| 4,310,839 | 1/1982 | Schwerdt | 340/709 |

FOREIGN PATENT DOCUMENTS

| | | | |
|---|---|---|---|
| 52-67937 | 6/1977 | Japan | 364/401 |
| 54-134532 | 10/1979 | Japan | 364/401 |

*Primary Examiner*—Gary Chin
*Attorney, Agent, or Firm*—Pollock, VandeSande & Priddy

[57] ABSTRACT

A plurality of data entry terminals is connected to a microprocessor system which analyzes terminal data for display on a production CRT, intended to be located in a restaurant kitchen. Food items entered on the terminal are displayed with a corresponding symbol denoting a work station where such food item is to be prepared. As each item is prepared, the food preparer enters a display symbol to signify its completion. Upon completion of all items in a food order, the microprocessor system erases the order from the CRT. A separate CRT may be connected to the microprocessor system for use by a food expediter. As each order is completed by the food preparers, the order is visually displayed on the expediter CRT thereby alerting the food expediter to collect the items of an order in the kitchen so that they may be picked up by a waiter.

13 Claims, 8 Drawing Figures

```
PRODUCTION CRT 30
     —    A   A   X   H B
     —    W E L L
     —    B   A   Y   C O K E
          N O I C E
          C   A   Z   S T E A K
          P O T
   2 ┌─┐  A   B   X   H D
   * └─┘
   3      A   A   Y   C O K E
```

FIG. 3

```
EXPEDITER CRT 34
   2 ┌─┐  A   B   X   H D
   * └─┘
```

FIG. 4

| CASH REGISTER KEYBOARD | | | | 48 |
|---|---|---|---|---|
| MED | HB | VOID | A | |
| WELL | COKE | COFFEE | B | |
| NO ICE | STEAK | TEA | C | |
| POT | HD | TOTAL | D | |

FIG. 2

RESTAURANT VIDEO DISPLAY SYSTEM

FIELD OF THE INVENTION

The present invention relates to data processing systems using CRT displays and more particularly to such a system in a restaurant environment.

BRIEF DESCRIPTION OF THE PRIOR ART

In a typical restaurant having a relatively high volume, different items of a food order are made by food prepares at various work stations. For example, one individual may have the responsibility of preparing salads while a second individual has the responsibility of preparing broiled entrees. In order to maximize the efficiency of food preparation, food preparers should be working on the same order at a particular point in time so that the order is quickly completed. Another individual, typically called the food expediter, has the responsibility of collecting the items of an order from the various production stations and collecting these items for pickup by a waiter.

The conventional procedure for the preparation of food orders involves hand writing or machine printing of food orders, as initiated by a waiter, from which the food preparers obtain information for the completion of an order. In the event an order is posted in the kitchen, each food preparer must run back and forth between the posted order and his work station, which involves a great deal of lost motion and time. Alternately, if duplicate orders are prepared, the papers upon which the orders are written or printed become easily misplaced, which causes confusion.

The inefficiency and confusion is further compounded when the expediter must obtain the papers upon which the orders are printed or written so that he may collect the items necessary to complete an order.

Accordingly, it would be greatly advantageous for a "paperless" communication system to be established between the waiter and the kitchen which would allow all those involved in food preparation and serving to keep track of food preparation.

Prior art systems have recognized the usefulness of communicating information between a kitchen and an individual who takes customer orders. Known prior art CRT display systems have been used in the environment of fast food operations. Specifically, in such prior art systems a customer's order is entered on a keyboard. The order is simply translated to a CRT monitor at a food preparation location thereby permitting kitchen personnel to collect the order item for pickup. However, in such prior art systems, the number of food items is severely limited so that there is no need for numerous food preparation stations and an additional expediter who collects order items from these various stations for waiter pickup.

BRIEF DESCRIPTION OF THE PRESENT INVENTION

The present invention is an improvement upon the basic keyboard-CRT monitor just described as prior art. The present system is intended for a restaurant having kitchen operations which are more complex than those found in a fast food operation.

A plurality of data entry terminals, such as electronic cash registers, typically located in a dining room, is connected to a microprocessor system which analyzes data entered in the cash registers for display on a production CRT, intended to be located in a kitchen. Each food item entered on the cash register is displayed with a corresponding symbol denoting a work station where such food item is to be prepared. As each item is prepared, the food preparer enters a display symbol next to the item to signify its completion. Upon completion of all items in a food order, the microprocessor system automatically deletes the order from the CRT. A separate CRT is located at each production work station so that all food producers can visually keep track of the completion of each item in a food order. A separate CRT may be connected to the microprocessor system for use by a food expediter. After each order is completed by the food preparers, the order is visually displayed on the expediter CRT thereby alerting the food expediter to collect the items of an order in the kitchen so that it may be picked up by a waiter. The expediter need not keep track of the items as they are being produced. Rather, he need concentrate on only those orders which have been completed. A keypad entry by the expediter erases the display of the picked-up order from the expediter's CRT.

Other features of the present invention include a keyboard for entering a message for display on the expediter CRT as the occasion requires.

Further, a line printer may be connected to the microprocessor system to provide a means of printing order information in the event that the system memory becomes filled. The system may also be programmed to print all order information so that there is a chronological "hard copy" of each order as it is transacted.

By virtue of the present invention, each food production station has a CRT monitor displaying the same information so that the individual items of one food order may be prepared during the same time interval. This communication of information does not suffer from the previously explained problems with handwritten or printed order forms. This greatly decreases the time necessary to complete a food order and minimizes confusion and error by those preparing the food items.

The above-mentioned objects and advantages of the present invention will be more clearly understood when considered in conjunction with the accompanying drawings, in which:

BRIEF DESCRIPTION OF THE FIGURES

FIG. 2 is a simplified illustration of a cash register keyboard layout permitting entry of food items thereon.

FIG. 3 is an illustration of a food production CRT monitor screen showing food order items displayed thereon.

FIG. 4 is an illustration of a food expediting CRT monitor screen displaying finished food orders.

DETAILED DESCRIPTION OF THE INVENTION

Figure 1:
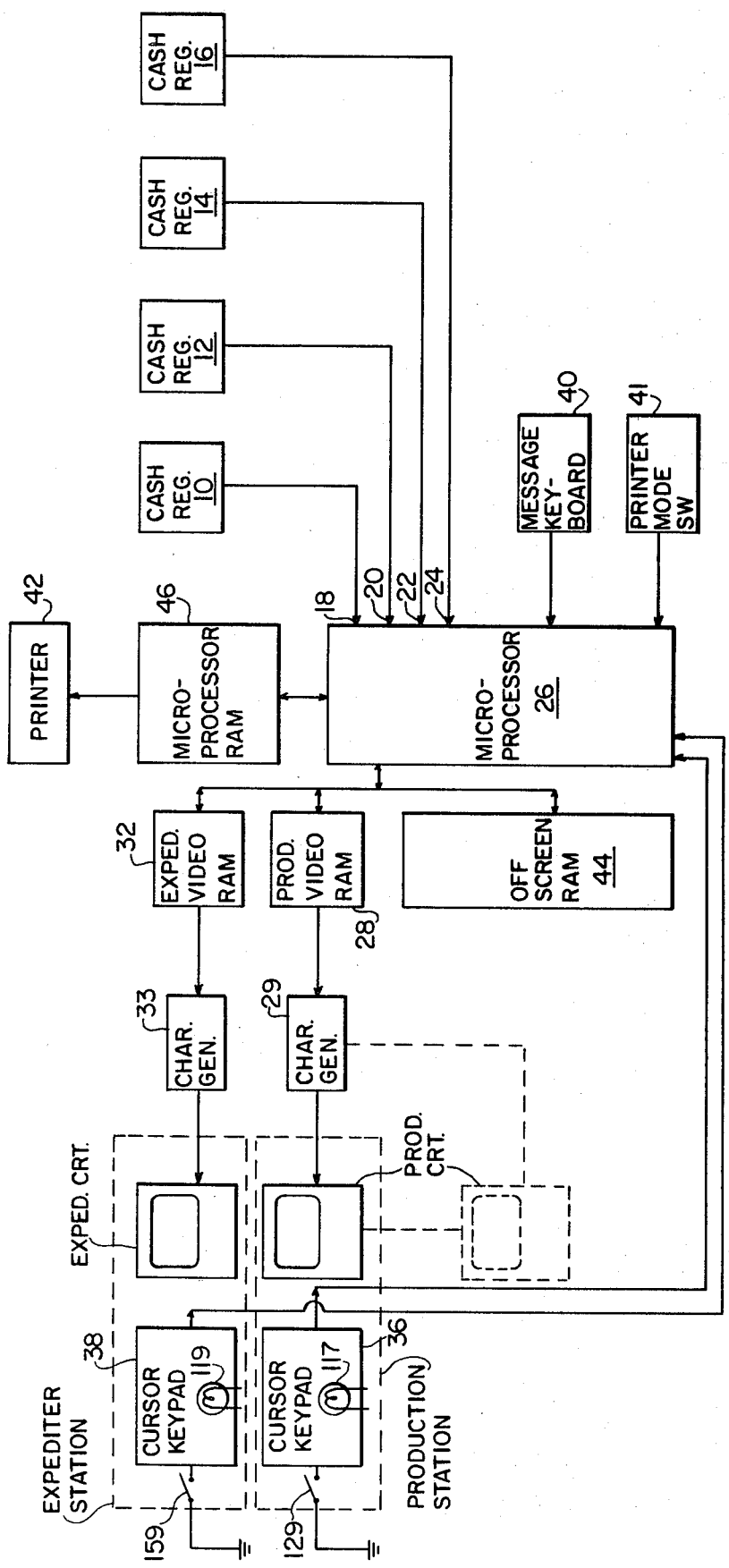
FIG. 1 is a block diagram of the present video display system.

Referring to the figures, and more particularly FIG. 1 thereof, it will be seen that the inputs to the video display system are derived from a number of data entry terminals such as electronic cash registers, chosen in number, by way of example, to be the four cash registers, 10, 12, 14 and 16. Typically, these registers are located at different points in a dining room. Data entered in the cash registers is fed to computing means, preferably microprocessor 26, through respective cash register input ports 18, 20, 22 and 24 and stored in RAM 46. The keys of the cash registers, as shown in FIG. 2, include food item labels so that when these keys are depressed, a data word, corresponding to the food item, is generated by the cash register for communication to the microprocessor 26. By way of example, each cash register indicated in the figure may be a Model L-45, manufactured by the Sweda Division of Litton Industries Corp.

The microprocessor may be of the type manufactured by Motorola Corporation, product Number 6802. The data provided by each cash register to the microprocessor undergoes formatting and validation of data stored in RAM 46 in the conventional manner. Thereafter, when the SERVICE or TOTAL key (FIG. 3) is depressed by the waiter, the food item data is transmitted to a video RAM 28, to be referred to as the Production Video RAM. As is conventionally done, a signal generator 29 is connected to the output of this RAM 28 so that the RAM contents may be displayed on a Production CRT 30. As indicated by dotted lines, additional Production CRTs may be located at separate food preparation stations and connected in parallel so that the same food items will be displayed on each CRT 30. The displayed items will signify the individual items of a food order as entered on a cash register by a waiter or waitress.

An exemplary cash register keypad 48 is shown in FIG. 2. The items indicated on this keypad as well as certain descriptors for these food items are shown in the following table:

| Medium | Hamburger | Void | Waiter A |
|---|---|---|---|
| Well Done | Coke | Coffee | Waiter B |
| No Ice | Steak | Tea | Waiter C |
| Potato | Hot Dog | Total | Waiter D |

FIG. 3 illustrates the display which will appear on the Production CRT 30 after waiter A has entered food items as expressed by the following chart:

| Order 1 | Item A | Waiter A Well Done | Work Sta. X | Hamburger |
|---|---|---|---|---|
| Order 1 | Item B | Waiter A No Ice | Work Sta. Y | Coke |
| Order 1 | Item C | Waiter A Potato | Work Sta. Z | Steak |
| Order 2 | Item A | Waiter B | Work Sta. X | Hot Dog |
| Order 3 | Item A | Waiter A | Work Sta. Y | Coke |

In the chart appearing above, it has been indicated that each food item is assigned to a production work station. Thus, work station X has the responsibility of preparing similar foods such as hot dogs and hamburgers while work station Y prepares soft drinks. In the example of the chart, work station Z would have the responsibility for broiled meats such as steak. It is anticipated that each work station would have a Production CRT 30 with identical displays thereon, so that the individual food preparers at the production station may work together to complete orders during the same time periods. The sequential numbering of orders and items within an order is generated internally by microprocessor 26. In FIG. 3 the example illustrates the entering of three successive orders.

With continued reference to FIGS. 3, it will be noted that the seventh line of the display indicates an asterisk preceding the order number. As will be explained hereinafter, the asterisk signifies a cursor which may be moved by a food preparer to a particular item after he has finished the preparation thereof. A cursor keypad 36 of conventional design is provided as an input to the microprocessor 26 to move the cursor vertically, with respect to the display of FIG. 3. After a food preparer has located the cursor on the Production CRT 30, adjacent an item which has been prepared, he depresses an appropriate ENTER switch 129 on the cursor keypad 36, which causes the microprocessor 26 to generate an item completed code which is subsequently translated by character generator 29 to a symbol such as the rectangle indicated between the first two characters on the seventh line of the Production CRT of FIG. 3. This symbol signifies to all other food preparers that that particular item has been completed.

When the cursor is moved to a last item of an order and the Enter switch 129 is depressed, the rectangular symbol, shown in FIG. 3, indicates completion of the second order and the microprocessor, cognizant of this occurrence, and will cause the order to be moved to an expediter CRT 34, shown in FIG. 4. Specifically, the data to be displayed on the expediter CRT 34 is transferred from the microprocessor RAM 46 to the expediter video RAM 32 after which character generator 33 operates upon the expediter data for its display on CRT 34. The expediter CRT enables the food expediter to monitor completed orders thereby permitting him to collect the items of each completed order and transfer them to a pick-up location for the waiter or waitress who had placed the order. As each order is erased from Production CRT 30, it appears on expediter CRT 34. Both production and expediter CRTs 30, 34 are preferably of the underscan type such as manufactured by the Bell & Howell Corp.

This system also envisions the optional inclusion of a printer 42, such as Model 7000+ manufactured by LRC Corp. The printer may be programmed, by virtue of a proper positioning of printer mode switch 41, to print the items of each order as they are transferred from the Production CRT 30 to the expediter CRT 34. The printer may also be employed in a second mode. As shown in FIG. 1, off screen RAM 44 provides storage for orders to be displayed after currently displayed orders are erased. In the event that the off screen RAM capacity is exceeded, the printer 42 may be programmed to receive data that would otherwise cause the RAM to overflow. This will give the food handling personnel a "hard copy" of the orders to be filled. As soon as the preparation of orders keeps pace with the orders being provided to the system, the printer may cease producing such a "hard copy".

The printer mode switch 41 may be positioned in a third mode whereby the printer 42 may be programmed to print each order as it is displayed on the Production CRT 30 thereby providing a chronological "hard copy".

Each order appearing on the expediter screen will remain displayed until one of two conditions occurs. The first condition occurs when the expediter actuates a cursor keypad 38 for moving a cursor vertically on the screen of the expediter CRT 34. Upon positioning of the cursor alongside an order which the expediter has completed for pick-up, an ENTER switch 159 is depressed on the cursor keypad, as in the case of keypad 36 (FIG.

1), thereby signalling the microprocessor 26 to erase the particular order. In a second instance, the microprocessor will cause the oldest appearing order on an expediter CRT to be erased when the space is necessary to display lines in an incoming order which has just been transferred from the Production CRT 30 to the expediter CRT 34. This last mode of operation allows automatic erasing of expediter CRT orders which have been presumably completed for pick-up.

Referring again to FIG. 1, an optional message keyboard 40 is shown connected to an input port of the microprocessor 26. The keyboard may be of the type manufactured by the Radio Corporation of America and which generates parallel ASCII code data. The keyboard 40 provides the capability of generating a message on the expediter CRT 34 thereby permitting remote communication from the dining room to the kitchen.

Figure 5:
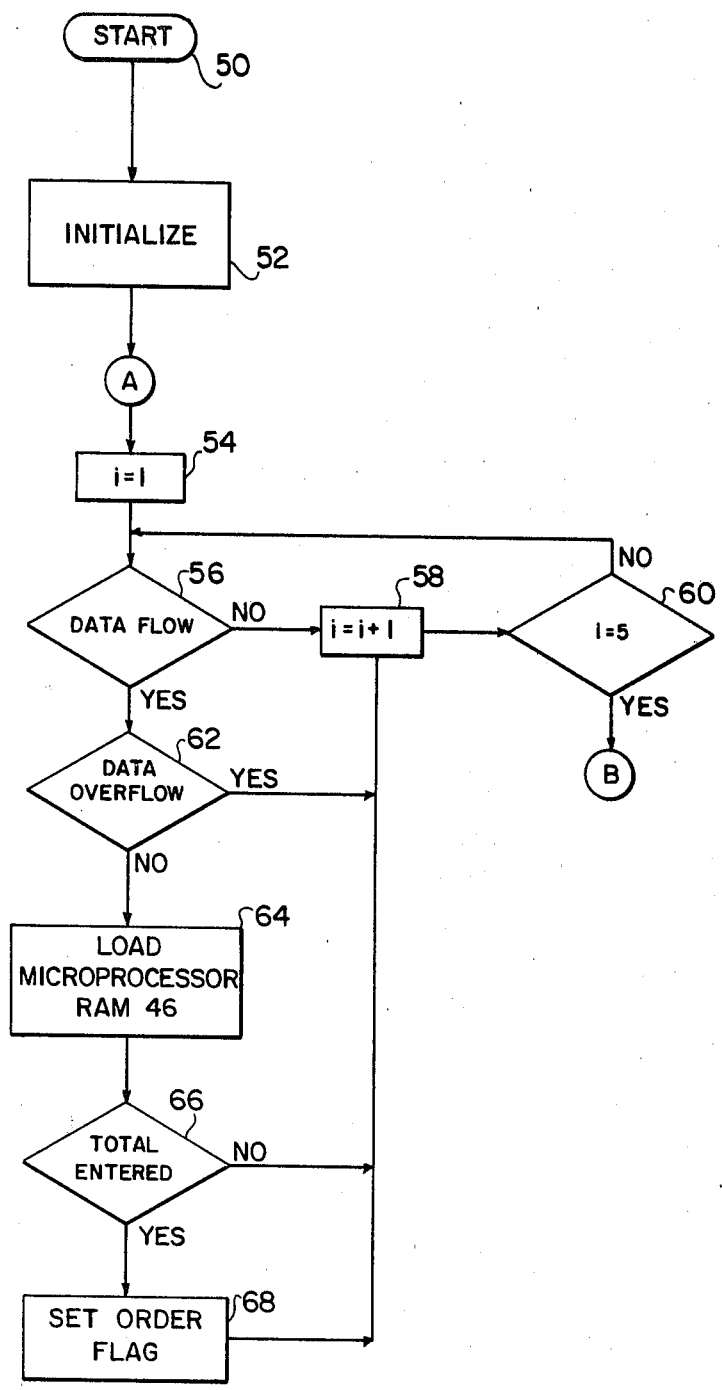
FIGS. 5-8 are flow charts of the program executed by the microprocessor of the present system.

FIGS. 5-8 illustrate the flow chart for the program which operates the microprocessor 26 of the system. The start of the program is indicated in FIG. 5, at step 50, which is succeeded by the Initialize step 52, wherein system initialization occurs with the setting of flags and other conventional data preparation. Thereafter, the program switches between the various cash registers employed. Thus, a counter is set to "1" in step 54 indicating an operation in connection with the first cash register 10 connected to input port 18. An inquiry is made at step 56 as to whether data from cash register 10 is being received at the input port 18. If the answer is in the negative, the program proceeds to step 58 which increments the counter to perform a similar inquiry on the second cash register 12, etc. Step 60 performs a comparison between the counter and the total number of cash registers in the system +1. Thus, in the present example, the inquiry is made on the basis of a count equal to 5. When the count is reached, the program has successfully queried each of the cash registers in turn and the program proceeds to point "B" picked up in FIG. 6. However, in the event that data is presented at an input port for a particular cash register, the program proceeds to step 62 for the checking of a system flag to determine whether a memory overflow condition exists. The flag is set during step 90 of the routine indicated on FIG. 6 and is subsequently cleared during step 106 of the routine illustrated in FIG. 7. However, if during step 62 (FIG. 5) the flag is detected, the data from the queried cash register is ignored since the data cannot be handled by the system in an overflow condition. The program would then proceed to steps 58 and 60 previously mentioned wherein similar results would follow until the overflow condition is corrected. In the event a flag is not set, data received from the queried cash register is loaded into the microprocessor RAM 46 as indicated by step 64 in FIG. 5. Each cash register is provided with a TOTAL key as shown in FIG. 2 and step 66 tests to see whether that key has been depressed by a waiter or waitress, thereby signifying the completed entry of an order. If this event has not occurred, the program proceeds to step 58 to iterate the program to a subsequent cash register. If it has occurred, a flag is set during step 68 and then the program advances to step 58.

Figure 6:
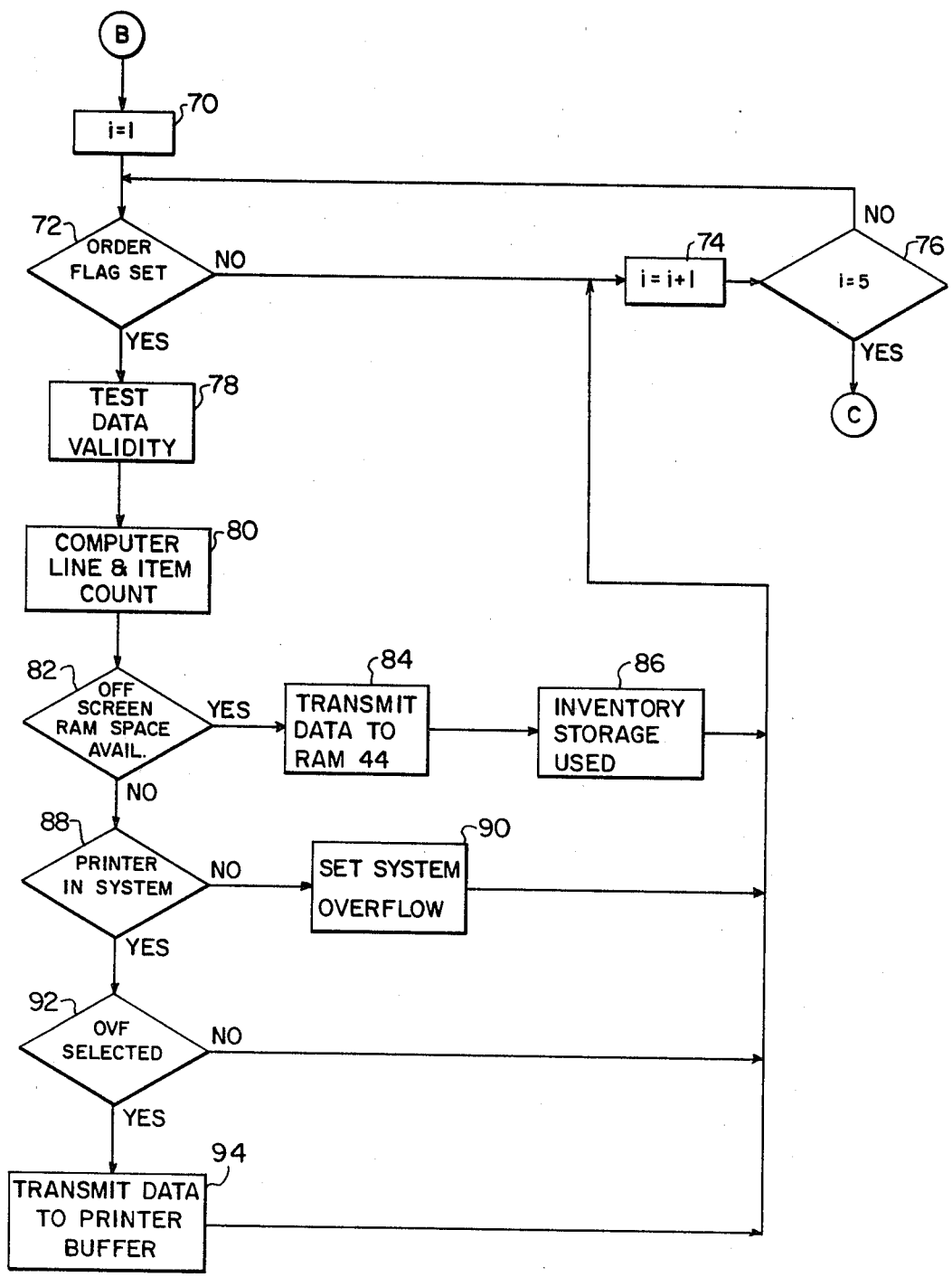

If an affirmative comparison results from step 60, the routine continues at point "B", indicated at the top of the flow chart shown in FIG. 6. In step 70, the counter is reset so that the cash registers will be queried seriatim. The following comparative step 72 checks to determine whether a completed order has been entered in the first cash register. If one has not, then the program proceeds to step 74 which increments the counter to a succeeding cash register to permit this inquiry to be made once again. If a completed order has been entered in the cash register, the program proceeds to step 78 wherein validity tests on the received data are performed. In succeeding step 80, there is a computation of the item count and the total line count for the entered order and during step 82 the off screen RAM 44 (FIG. 1) is investigated to determine whether space is available therein to hold this order. In the event there is insufficient off screen RAM space, the program proceeds to step 84 where the order data is formatted into the off screen RAM and the number of lines which have been used to store this order is marked during step 86 so that an inventory of available space is kept current. In the event there is insufficient off screen RAM space available, the program advances to step 88 and checks to see whether an optional line printer 42 exists in the system. In the event there is no such printer and an overflow condition exists while all available off screen RAM storage has been used, an overflow flag is set at step 90. In the event a printer is installed in the system, the program proceeds to step 92 to investigate whether the printer mode switch 41 has been set to permit the printing of overflow data. If the switch has not been so set, data will be lost and the program proceeds to step 74 where the next cash register will be queried. Of course, if data is immediately available to the system from the next register, the same overflow situation will continue until offscreen RAM space becomes available.

On the other hand, if the printer mode switch 41 has been positioned to print overflow data, the program proceeds to step 94 where the order data is formatted and transmitted to a printer buffer which may be located in printer 42. After the buffer has been filled with order data, the printer 42 will print this information. After the printing occurs, the program will again return to step 74 where the counter is incremented to a succeeding cash register to be queried. After the last cash register in the system has been queried, the program will proceed to step 76 which leads the program to point "C" in FIG. 7. During step 96 shown in FIG. 7, a determination is made as to whether the data from any orders exist in the off screen RAM 44 and are awaiting to be displayed. If there are none, the program proceeds to step 114 which will be discussed hereinafter. However, if there is sufficient space available in RAM 44, the program proceeds to step 98 where a determination is made as to whether there is space available on the production screen for the next order stored in RAM 44. If there is not, the program advances to step 114. If there is, the next step executed is step 100 where the number of lines in the stored order are moved to the production CRT from the RAM 44. At this moment, the additional number of lines transmitted to the production CRT is marked during step 102 and in a corresponding amount of off screen RAM space is inventoried and noted in step 104. Now that RAM space is available, the system overflow flag is cleared during step 106.

During step 108, the determination is again made as to whether the optional line printer is connected to the system. If it is not, the program proceeds to step 114. If the printer exists, a check is made as to whether the printer mode switch 41 has been so positioned as to cause the printing of all orders entered in the system. These determinations are made during steps 108 and 110. If the printer switch 41 is not set in this mode, the program continues with step 114. However, if the switch 41 is in the appropriate position, the order data is formatted and transferred to the printer buffer for printing as was done during step 94 (FIG. 6).

When step 114 is being executed, a determination is being made as to whether the production cursor keyboard 36 is being used. If it is in use, a busy light 117 (FIG. 1) is turned on during step 118. If it is not being used, the busy light is turned off during step 116. In a preferred embodiment of the invention, the busy light 117 is physically mounted in proximity to the cursor keypad 36.

During step 120, a similar check of keypad use is done in connection with the expediter cursor keypad 38. If this keypad is in use, the busy light 119 (FIG. 1) is turned on during step 124. If it is not in use, the program proceeds to step 122 to ensure that the busy light is turned off. In either event, the program then proceeds to point "D" on FIG. 8.

Figure 7:
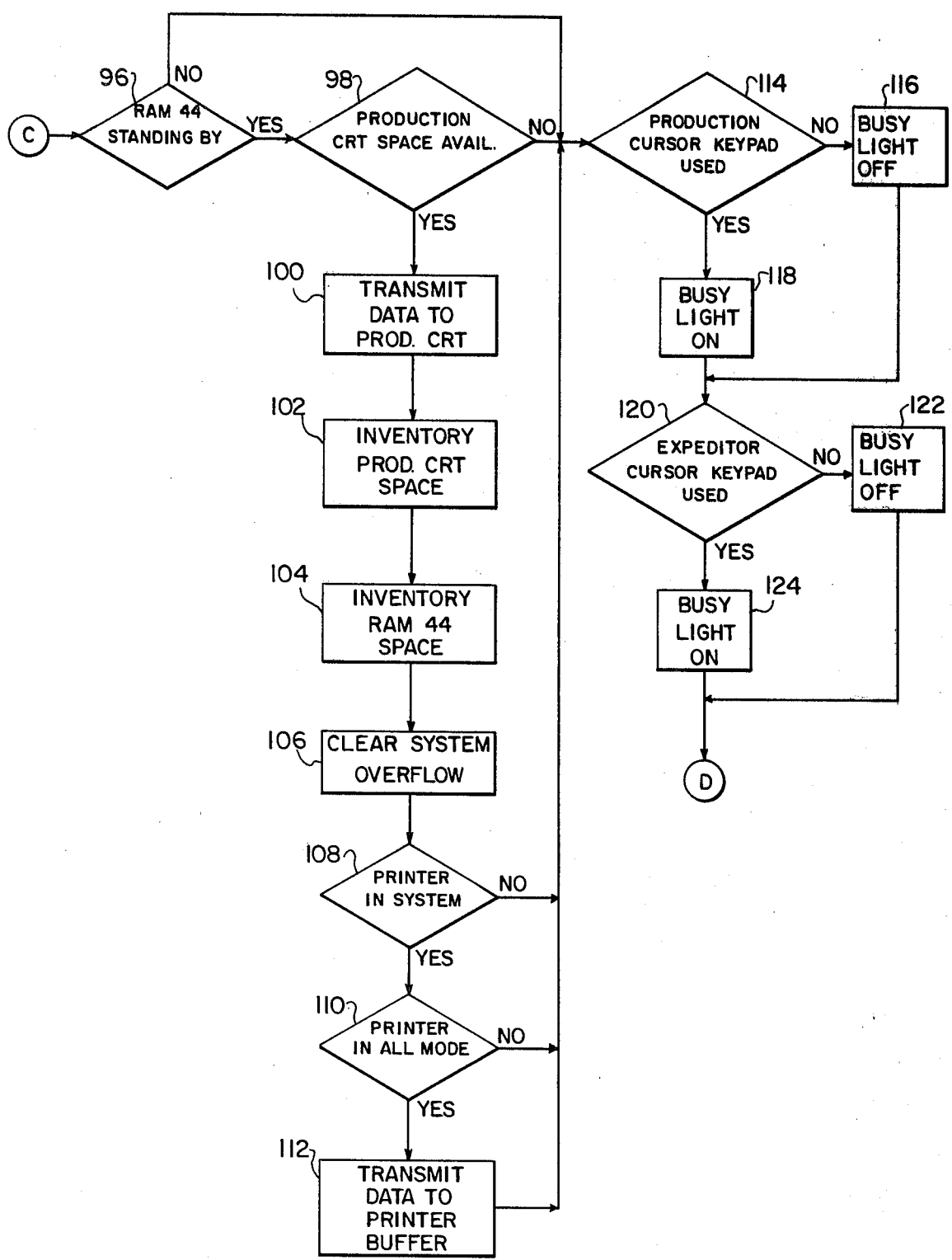
Figure 8:
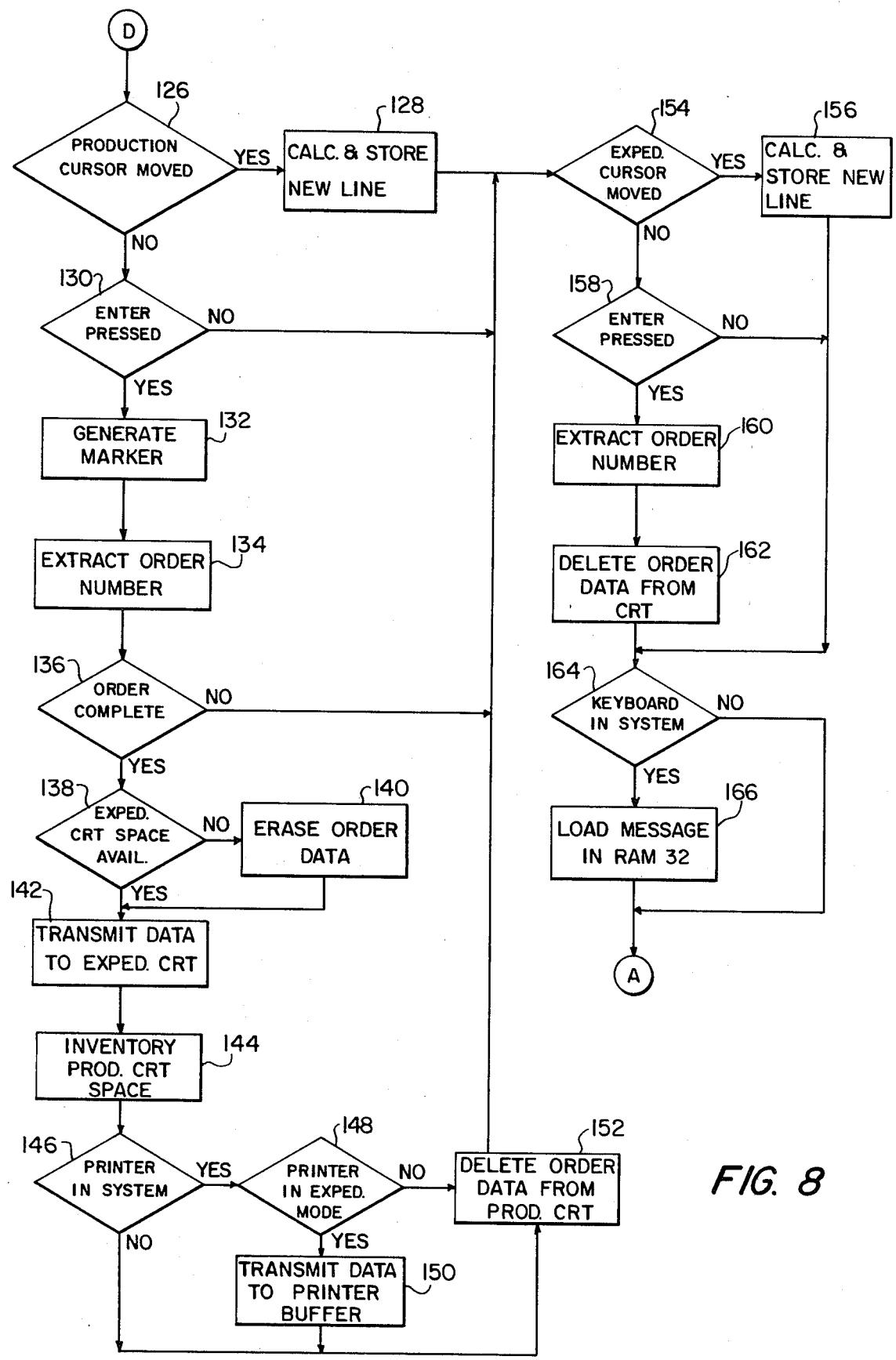

In the event the production cursor keypad was used, the affirmative event is noted during step 126 and a calculation and storage is made of the new line to which the cursor has been moved during step 128. In the event the cursor was not moved, the program proceeds to step 130 to determine whether the production cursor keypad ENTER switch 129 (FIG. 1) has been depressed during step 130. If it has, the program then proceeds to step 132 where the item, at which the cursor is located, is marked with the rectangle symbol previously discussed to indicate the completion of this food item. During step 134, the order number assigned to this item is extracted and during step 136 a determination is made as to whether this completed item represents the last item to be completed in the order. Assuming that it is, the program proceeds to step 138 where a test is made to determine whether sufficient space is available on the expediter CRT 34 to hold all the data of this last completed order. This determination is made during step 138 and in the event there is insufficient space available the program proceeds to step 140 wherein there is an erasure of the oldest orders being displayed on the expediter CRT 34, until there is sufficient space to contain the current order. After step 140, there is a transmission of the current order to the expediter CRT 34 during step 142 and during the subsequent step 144, an inventory of the production CRT space is updated because the display of an order on the expediter CRT causes its simultaneous erasure from the Production CRT 30. During step 146, the system is again checked to see whether an optional line printer 42 exists. If not, the program proceeds directly to step 152 which causes the deletion of a transferred order from the production screen. However, if a line printer exists, the program moves to step 148 for determination as to whether the printer mode switch 41 has been positioned in a mode for causing the printing of only those orders being transferred from the production to the expediter CRT. In the event that this switch position has been selected, the program continues with step 150 which causes the transmission of this transferred data to the printer buffer in a manner similar to that occurring during step 94 (FIG. 6) and 112 (FIG. 7). Then, step 152 causes the deletion of the order from the Production CRT 30.

During the next step 154, the expediter cursor keypad 38 is checked to determine whether it has been activated to cause the expediter cursor to be moved. If it has, the program advances to step 156 where the new line at which the expediter cursor exists is calculated and stored. If the expediter cursor has not been moved, the program advances to step 158 to determine whether the ENTER switch 159 (FIG. 1) on the expediter cursor keypad 38 has been depressed. If it has, the next step operated upon is 160 wherein the order number is extracted for the food item line next to which the cursor appears. During the subsequent step 162, the entire order, associated with the item next to which the cursor appears, is deleted from the expediter CRT 34.

In step 164, the system is checked to see whether the optional message keyboard 40 exists in the system. If an affirmative response results, the program advances to step 166 wherein a message entered in that keyboard is transmitted to the expediter CRT 34. In a preferred embodiment of the invention, a few lines on the bottom of the expediter CRT 34 is reserved for such messages. After the loading of such a message in RAM 32, during step 166, for display on expediter CRT 34, the program returns to point "A" (FIG. 5) to reiterate the program steps just described.

Although the aforementioned description discusses the generation of messages on the expediter CRT, it is within the bounds of the present invention to display such messages on the production CRTs as well. Further, the CRTs employed may be black and white or color.

Still further, although the invention has been described in the application of a restaurant video display system, it should be recognized that the invention has equal application to any operation wherein a number of individual items are produced at different work stations and finally expedited for packaging or assembly.

It should be understood that the invention is not limited to the exact details of construction shown and described herein for obvious modifications will occur to persons skilled in the art.

We claim:

1. A video display system comprising:
   a plurality of item data entry means, connected to an input of data computing means, for entering individual items of an item group;
   a plurality of production CRTs connected in circuit with the output of the computing means for displaying the entered items, each item assigned a symbol, by the computing means, corresponding to a work station whereat the item is prepared;
   cursor control means located at the work station and connected in circuit with the computing means for marking an item upon completion of its preparation by selective cursor placement;
   the computing means determining when preparation of all entered items of a group have been completed and thereafter erasing such displayed items from the CRT.

2. The subject matter of claim 1 together with an expediting CRT connected in circuit with the computing means for displaying the items of each group as its preparation has been completed.

3. The subject matter of claim 1 together with printing means connected to the output of the computing means for printing selected data entered into the computing means.

4. The subject matter of claim 1 together with a keyboard connected to an input of the computing means for entering a message therein which is displayed on the expediting CRT.

5. The subject matter of claim 2 together with a second cursor control means located at an expediter station and connected in circuit with the computing means for positioning the cursor at the last item of a group displayed on the expediting CRT, causing the erasing of the group displayed thereon.

6. The subject matter of claim 2 wherein the computing means is a microprocessor.

7. The subject matter set forth in claim 6 together with RAM means for storing data entered into the microprocessor.

8. The subject matter set forth in claim 7 together with video RAM means connected between the microprocessor and respective CRTs for storing characters to be displayed thereon; and character generating means connected between the video RAM means and respective CRTs for converting stored characters to character display information.

9. In a video display system comprising:

a plurality of item data entry means, connected to an input of data computing means, for entering individual items of an item group;

a plurality of production CRTs connected in circuit with the output of the computing means for displaying the entered items, each item assigned a symbol corresponding to a work station whereat the item is prepared;

cursor control means located at the work station and connected in circuit with the computing means for marking an item upon completion of its preparation by selective cursor placement;

the computing means determining when preparation of all entered items of a group have beem completed and thereafter erasing such displayed items from the CRT;

an expediting CRT connected in circuit with the computing means for displaying the items of each group as the preparation of each group has been completed;

printing means connected to the output of the computing means for printing selected data entered into the computing means;

a keyboard connected to an input of the computing means for entering a message therein which is displayed on the expediting CRT; and a second cursor control means located at an expediter station and connected in circuit with the computing means for positioning the cursor at the last item of a group displayed on the expediting CRT, causing the erasing of the group displayed thereon.

10. A method for tracking the preparation of food items in an order as entered in a data entry terminal, the method comprising the steps:

transferring order data from the terminal to a storage medium;

removal of the data from storage for display of the items;

ascribing a work station symbol for each displayed item, depending upon the station at which it is prepared;

selectably positioning a cursor next to each item as its preparation is completed;

displaying a symbol on the line of the item indicating such completion;

detecting the completion of the last item of each order; and erasing the display of the entire order thereby creating blank space for displaying newly entered orders.

11. The subject matter set forth in claim 10 together with the steps of transferring the data of each completed order to an expediting station for display thereat;

selectably positioning a cursor next to an item of the transferred displayed order and therafter erasing the display of the order.

12. The method as described in claim 11 together with the step of printing order data.

13. The method as set forth in claim 11 together with the step of entering messages on the display at the expediting station.

* * * * *